May 26, 1925.  1,539,126
V. LINK
APPARATUS FOR VAPORIZING FUEL
Filed Aug. 12, 1921
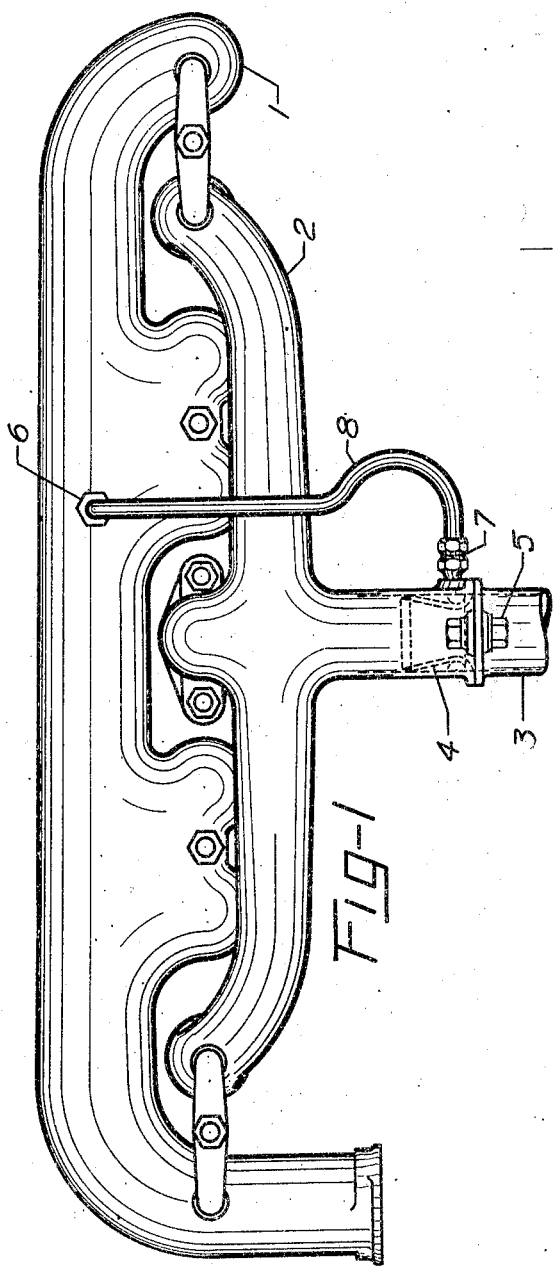
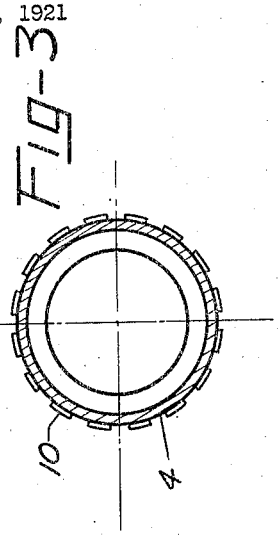
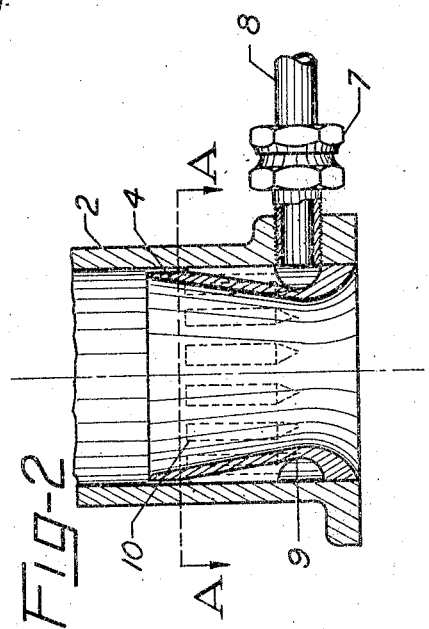
INVENTOR
*VINCENT LINK*
BY *William MacGlashan*
ATTORNEY Patented May 26, 1925.

1,539,126

UNITED STATES PATENT OFFICE.

VINCENT LINK, OF DETROIT, MICHIGAN, ASSIGNOR TO STUDEBAKER CORPORATION, A CORPORATION OF NEW JERSEY.

APPARATUS FOR VAPORIZING FUEL.

Application filed August 12, 1921. Serial No. 491,787.

*To all whom it may concern:*

Be it known that I, VINCENT LINK, a citizen of the United States of America, and resident of Detroit, in the county of Wayne and State of Michigan, have invented certain new and useful Improvements in Apparatus for Vaporizing Fuel, of which the following is a specification.

My invention relates to an apparatus for effecting more complete vaporization of fuel, and, incidentally, for preventing the condensation of fuel on the intake manifold walls in an internal combustion engine, thereby materially increasing the efficiency of the engine.

When an internal combustion engine using liquid fuel is in operation, it is well known that the mixture passing through the intake passage is in the form of a mist or fog, with a lighter or heavier fuel content, depending upon the volatility of the fuel and the velocity of the air stream at the point and instant of mixing. Thus the mixture passing through the intake passsage may at one instant consist of a fine, almost dry mist, and at another instant of comparatively large drops of fuel suspended in the air current like rain. When in the former state, there is a tendency of the fuel to condense on contact with the walls of the intake passage, and, in the latter state, the large drops of fuel have a pronounced tendency to separate out of the mixture, and become deposited on the walls of the intake passages, where they collect into still larger drops, or form into a liquid steam, travelling slowly in the direction of the fuel current, and are thus liable to be picked up on acceleration of the same at any time thereafter, producing more or less uncontrolled and erratic functioning of the engine.

The object of the present invention is to correct and remedy this trouble by either preventing the fuel from depositing, or, if it deposits, to cause it to be revaporized and thrown back into the body of the fuel mixture stream and preclude it from redepositing, thereby increasing the calorific efficiency of the engine.

The mode of operation of the invention is such that the heavy, unvaporized particles of fuel on the outside edge of the stream of incoming combustible mixture, are caused to impinge upon a hot member, which is preferably of such conformation as to slightly constrict the intake passage at such point, causing the fuel particles to be vaporized. The invention further provides for the production of an envelope of hot gas which will surround, but not mix materially with, the combustible mixture passing through the intake manifold. The heat imparted to the mixture by the projecting member is not sufficiently high to materially affect the whole of the mixture, but, as a rule, to merely prevent deposition of, or if deposited, to revaporize the fuel particles. The envelope of hot gas insulates the mixture from the manifold walls and prevents any of the mixture from condensing thereon. Furthermore, the operation of the heating device is such that as the engine speed increases, its heating effect decreases, and vice-versa, thereby resulting in the most desirable conditions for efficient operation of the engine.

The specific device preferably employed from a structural standpoint, embodies a sleeve or shell of suitable shape, positioned within the intake manifold between the carburetor and the engine cylinders, and slightly constricting the intaking passage at this point. This sleeve or shell has a space between it and the walls of the manifold, into which projects ribs formed on the exterior of the shell. At the end of the sleeve or shell nearest the cylinders, and extending around and adjacent to the inside of the manifold wall, is a small opening, the other end of the sleeve or shell being in contact with the manifold wall. Hot products of combustion are brought through a tube into the space between the sleeve or shell and the manifold wall, heating the ribs and the sleeve or shell and escaping through the opening described, forming an envelope of hot gas for the combustible mixture passing through the manifold, and insulating the mixture from the manifold walls. As has been described before, the heavy particles of fuel carried along near the edge of the moving stream of combustible mixture, impinge on the sleeve or shell and are immediately heated, revaporized, and commingled with the mixture stream.

In the accompanying drawings:—

Figure 1 is a view of an intake and exhaust manifold with a device embodying my present invention shown in combination therewith.

Figure 2 is a fragmentary enlarged section through part of the intake manifold represented in Fig. 1 and containing a longitudinal section of the device.

Figure 3 is a section of the device taken on the line A—A of Fig. 2.

Referring to the drawings, 1 is an exhaust manifold, 2 is an intake manifold, 3 is the outlet end of a carburetor, not shown, secured to the intake manifold by the bolt 5, 4 is a device employed in practicing the present invention, consisting preferably, of a venturi shaped sleeve or shell as shown, altho the invention is not limited to any particular shape or form, the said shell being provided with ribs or fins 10 projecting from the sleeve or shell into the space between it and the manifold wall to thereby better absorb heat, closely fitting the intake passage 2 at the bottom and being of slightly smaller external diameter at the top, leaving a small opening adjoining and extending around the inside of the intake passage wall, as shown in Fig. 2, for the escaping of the hot products of combustion from the exhaust manifold, in such a manner as to form an envelope about the incoming stream of combustible mixture, thereby insulating the mixture from the manifold walls and tending to prevent any particles of fuel from condensing on the walls. The hot products of combustion are led from the exhaust manifold to the intake manifold through the tube 8 connected in place by the unions 6 and 7 as shown. An annular passage 9 in the sleeve or shell 4 allows the hot products of combustion to be equally distributed around the device to the different rib passages.

Formal changes, such as the substitution of equivalents, may be made in the specific process and structure described without departing from the spirit or substance of the invention, the scope of which is commensurate with the appended claims.

Having thus fully described the invention, what I claim as new and desire to secure by Letters Patent is:

1. In an internal combustion engine, the combination of an exhaust manifold, an intake manifold positioned between said engine and a carburetor, a member positioned within said intake manifold and having a portion of its walls spaced apart from said manifold, means connected with said exhaust manifold for supplying heat by the exhaust products of combustion from said engine to the chamber formed between said member and said intake manifold, and a restricted passage leading from said chamber to said intake manifold whereby the products of combustion can escape from said chamber in such a manner as to cause an envelope of hot gas around the incoming fuel mixture.

2. In an internal combustion engine, the combination of an exhaust manifold, an intake manifold having a passage connecting said engine with a carburetor, a member having a venturi-shaped passage therein within said intake passage between said carburetor and engine and having a portion of its length spaced apart from the walls of said passage, means for introducing hot gases from said exhaust manifold to the chamber formed between the spaced walls of said member and said intake manifold, and means for allowing said hot gases to escape from said chamber into said intake passage whereby the same will form an envelope of hot gas around the incoming fuel mixture and not mix with the same until after leaving said chamber.

3. In an internal combustion engine the combination of an exhaust manifold, an intake passage adapted to be connected with a carburetor, and a member placed within said intake passage between the carburetor and the combustion chamber, constricting the intake passage at this point, said member embodying a venturi shaped shell closely fitting the intake passage at the bottom, and forming a space between itself and the intake passage walls along its central portion for the introduction of products of combustion for heating said shell, and being further provided with a narrow opening at its top, adjacent to and extending around the intake passage wall, for allowing the hot products of combustion to escape from said sleeve in such a manner as to form an envelope of hot gas around the stream of combustible mixture flowing through the intake passage.

4. In an internal combustion engine, the combination of an exhaust manifold, an intake manifold connecting the cylinders of said engine with a carburetor, a hollow annular abutment in said intake manifold between said carburetor and said cylinders, a passage formed in the outer walls of said abutment, means connecting said passage and said exhaust manifold whereby hot gases from said manifold will heat the walls of said abutment and vaporize particles of fuel impinging thereon, so that they will be picked up by the incoming fuel mixture, and means whereby the hot exhaust gases can pass into the intake manifold and form an envelope of hot gases around the incoming fuel mixture.

5. In an internal combustion engine, the combination of an exhaust manifold, an intake manifold connecting the cylinders of said engine with a carburetor, a member positioned within said intake manifold comprising walls flaring outwardly at the upper end, ribs connecting said walls with the walls of said manifold, and a passage formed in said outer walls, means connecting said passage with said exhaust manifold whereby the hot gases from said manifold will heat the walls of said member, said hot gases passing into said intake manifold adjacent its walls and preventing any fuel particles from collecting on the same.

6. The method of conveying combustible gaseous vapors to an internal combustion engine consisting in passing such vapors from a carburetor through a manifold in communication with the internal combustion engine, in supplying hot non-condensable gases to the interior of the manifold, in distributing such gases in the manifold to form a column of gases traveling along the interior surfaces of the manifold to surround the combustible gaseous charge passing therethrough and to heat such surfaces of the manifold to prevent a substantial condensation of said combustible gases by largely maintaining said gases out of contact with the walls of the manifold.

7. The method of conveying combustible gaseous vapors to an internal combustion engine consisting in passing such vapors from a carburetor through a manifold in communication with the internal combustion engine, in supplying hot non-condensable gases to the interior of the manifold, in distributing such gases in the manifold to form a column of gases traveling along the interior surfaces of the manifold to surround the combustible gaseous charge passing therethrough and to heat such surfaces of the manifold to prevent a substantial condensation of said combustible gases by largely maintaining said gases out of contact with the walls of the manifold, said hot non-condensable gases also serving to cause an evaporation of any condensable products that may adhere to the walls of the manifold.

8. A method of conveying combustible gaseous vapors containing entrained unvaporized fuel particles to an internal combustion engine, consisting in passing such fuel mixture from a carburetor through a manifold communicating with the engine, in introducing a stream of hot non-condensable gases to said manifold, in distributing said heated gases in said manifold to cause the gases to travel therethrough in a colunm along the inner walls of the manifold to heat such walls and to envelop said combustible fuel charge to prevent substantial condensation of such gaseous combustible vapors by contact with the walls of the manifold and to impart the contained heat of the non-condensable hot gases to unvaporized fuel particles in said combustible gaseous charge during travel through the manifold to gasify the same.

Signed by me at Detroit, Michigan, U. S. A., this 29th day of July, 1921.

VINCENT LINK.

Witnesses:
 GEO. R. DAVENPORT,
 HODGSON S. PIERCE.